United States Patent
Masuda et al.

[19]

[11] Patent Number: 5,813,718
[45] Date of Patent: Sep. 29, 1998

[54] GUARD BEAM FOR AUTOMOTIVE DOOR STRUCTURE

[75] Inventors: Mituo Masuda; Takuo Sano, both of Shizuoka, Japan

[73] Assignee: Yamakawa Industrial Co., Ltd., Fuji, Japan

[21] Appl. No.: 533,836

[22] Filed: Sep. 25, 1995

[30] Foreign Application Priority Data

Feb. 14, 1995 [JP] Japan ..................................... 7-025087

[51] Int. Cl.$^6$ ........................................................ B60J 5/04
[52] U.S. Cl. ...................................... 296/146.6; 296/188
[58] Field of Search ................................ 296/146.6, 188; 49/501, 502

[56] References Cited

U.S. PATENT DOCUMENTS

| | | | |
|---|---|---|---|
| 4,796,946 | 1/1989 | Wilson et al. .................. | 296/146.6 |
| 5,232,261 | 8/1993 | Kuroda et al. .................. | 296/146.4 |
| 5,370,437 | 12/1994 | Alberda ............................ | 296/146.6 |
| 5,466,032 | 11/1995 | Clausen et al. ................. | 296/146.6 X |
| 5,580,120 | 12/1996 | Nees et al. ...................... | 296/146.6 |

FOREIGN PATENT DOCUMENTS

| | | |
|---|---|---|
| 4-208633 | 7/1992 | Japan . |
| 2280456 | 2/1995 | United Kingdom ............... 296/146.6 |
| 94/07709 | 4/1994 | WIPO . |

OTHER PUBLICATIONS

Patent Abstracts of Japan, vol. 17, No. 41, JP–A–04 260815, Jan. 1993.

Patent Abstracts of Japan, vol. 95, No. 001, JP–A–07 025239, Jan. 1995.

*Primary Examiner*—Joseph D. Pape
*Attorney, Agent, or Firm*—Foley & Lardner

[57] ABSTRACT

A guard beam of an automotive door structure can be relatively light in weight and yet have sufficient impact load absorbing capacity with stable strength at low cost. The guard beam has a beam portion and palm portions at both ends of the beam portion integrally made of a high tension steel blank member. The beam portion has a substantially triangular cross section with a bottom plate portion, support plate portions extending from a peak of the triangular configuration remote from the bottom plate portion in a direction substantially perpendicular to the bottom plate portion and side plate portions each connecting each end of the support plate portions at the peak to the transverse edge of the bottom plate portion.

12 Claims, 6 Drawing Sheets

GUARD BEAM FOR AUTOMOTIVE DOOR STRUCTURE

BACKGROUND OF THE INVENTION

1. Field of the Invention

The present invention relates generally to a guard beam for a door of an automotive vehicle. More specifically, the invention relates to a reinforcement guard beam disposed within an internal space of a vehicular door defined by an outer panel and an inner panel for protecting a passenger in a collision.

2. Description of the Related Art

In the recent years, owing to growth for demand for safety of automotive vehicles, a reinforcement, called as a guard beam, has been installed in the internal space of a vehicular door. The guard beam needs to be light and to have sufficient stiffness for protecting passengers from the collision at the side of the vehicle. In particular, the guard beam needs to have superior impact load absorbing characteristics for absorbing the energy at the collision.

Figure 6:
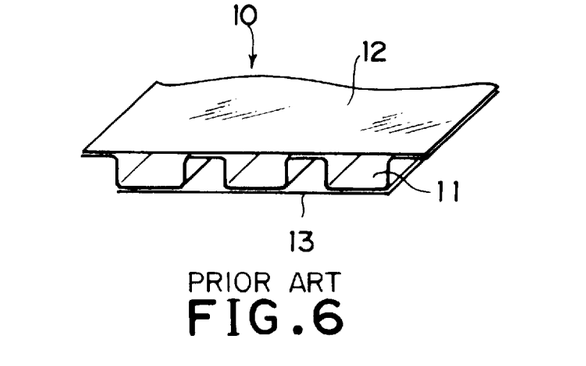
FIG. 6 is a partial perspective view showing a major part of a conventional guard beam.

In a conventional guard beam, a high tension steel panel having a tensile strength of 60 to 100 kgf/mm$^2$ has been employed. The high tension steel panels are combined by way of spot welding to form a box-shaped cross section as shown in FIG. 6 (see FIG. 4 of Japanese Patent Application Laid-Open No. 208633/1992). Alternatively, a conventional guard beam is constructed by welding palm portions at opposite ends of a tubular body, as shown in FIG. 7.

The guard beam 10 illustrated in FIG. 6, has a core member 11 corrugated to have three rectangular ridges through press. On both sides of the core member 11, a dolly panel 12 and a patch panel 13 are fitted by spot welding to form the box-shaped cross section. The guard beam 10 thus constructed is disposed within the internal space of the vehicular door with orienting the ridges of the core member 11 in the substantially horizontal direction for absorbing impact force upon collision as much as possible.

Figure 7:
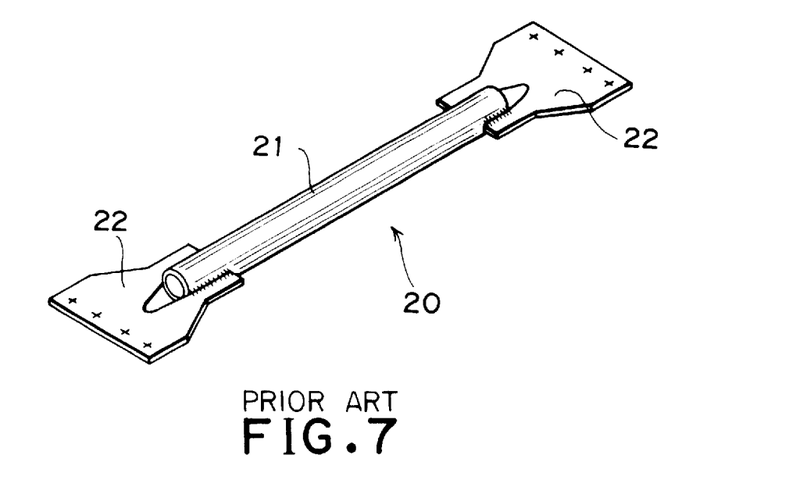
FIG. 7 is a perspective view showing overall construction of another conventional guide beam.
Figure 8:
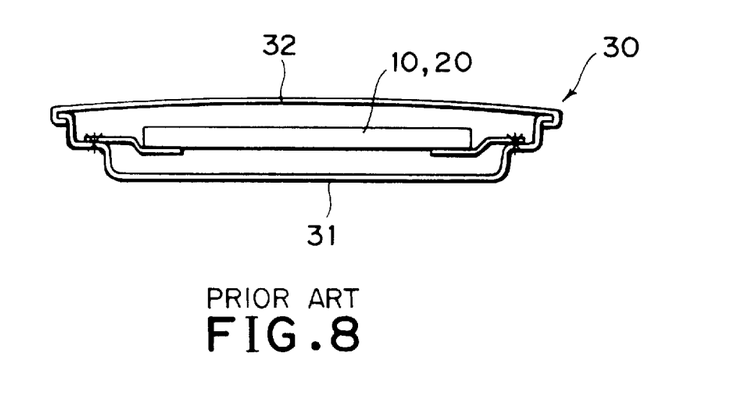
FIG. 8 is a sectional view showing a condition of installation of the conventional guard beam within a vehicular door.

On the other hand, the guard beam 20 illustrated in FIG. 7 includes a tubular base member 21 formed of a high tension steel or a hardened steel having a tensile strength of 100 to 180 kgf/mm$^2$. Palm portions (hereinafter referred to as mounting plates) are mounted on both axial ends of the tubular base member 21 by welding or the like. It should be noted that the guard beam 10 or 20 is extended between the both side flange portions of an inner panel 31 of the vehicular door 30, as shown in FIG. 8, with both ends of the beam fixed on the inner panel 31. In FIG. 8, reference numeral 32 denotes an outer panel of the vehicular door.

However, in the case of the guard beam 10 having the box-shaped configuration as shown in FIG. 6, when a crash test is performed with a concentrated load exerted at the central portion of the span, the core member 11 buckles when the exerted load reaches its maximum load capacity, and, subsequently, the load is abruptly lowered. Therefore, in a view point of impact absorption characteristics, the guard beam illustrated in FIG. 6 is not satisfactory.

On the other hand, in the case of the guard beam 20 having the base member 21 as shown in FIG. 7, since a tubular cross section of the base member 21 has a symmetric configuration with respect to the center, the base member 21 may have equal breakage conditions at a load exerted in any directions. However, geometrical inertia moment I and module of section Z are abruptly varied across the welding portion between the base member 21 and the mounting plate 22. The mounting plates 22 have smaller resistance against bending stress than that of the base member 21. Therefore, it can be said that both end portions of the base member 21 are formed of the material having relatively small contribution for absorption of the impact load. In addition, when the base member 21 is hardened, it is likely to warp the guard beam 20.

SUMMARY OF THE INVENTION

The present invention has been worked out in view of the problems in the prior art as set forth above. Therefore, it is an object of the present invention to provide an inexpensive guard beam for an automotive door structure that has no welding portion and is easy to form with superior impact load absorbing characteristics.

According to one aspect of the invention, a guard beam of an automotive door structure comprises:

a beam portion integrally made of a high tension steel blank member, having a substantially triangular cross section with a bottom plate portion, support plate portions extending from a peak of the triangular configuration remote from the bottom plate portion in a direction substantially perpendicular to the bottom plate portion, and side plate portions each connecting each end of the support plate portions at the peak to the transverse edge of the bottom plate portion, respectively; and a palm portions integrally formed with the beam portion at both longitudinal ends of the beam portions for securing the guard beam on a structural member of an automotive door.

In the preferred construction, the support plate portion may have an end remote from the peak, the end being held in contact with the bottom plate portion.

The palm portions may be substantially in the form of triangle gradually widened toward opposite ends and lie in the same plane as that of the bottom plate portion.

A part of the side plate portions may extend to edges of the palm portion so as to serve as reinforcement for the palm portion.

The palm portion may be formed with a reinforcement bead.

The support plate portion may have a tip end portion lying substantially parallel to the bottom plate portion.

According to another aspect of the present invention, there is provided a guard beam for an automotive door structure comprising:

a beam portion having a hollow cross section with a first fraction lying in parallel to a general plane on an automotive door, a second fraction lying substantially perpendicular to said general plane of said automotive door and bearing a first component of an impact force to be exerted on said automotive door in a direction perpendicular to said general plane, and a third fraction connecting between said first and second fractions and cooperated with said second fraction for distributing said impact force; and palm portions integrally formed at both ends of said beam portions and adapted to be fixed on a structural member of said automotive door for supporting said guard beam thereon.

The third fraction preferably extends substantially oblique to the general plane of the automotive door.

In the practical construction, the second fraction may comprise two flat plates stacked in side-by-side relationship, and a pair of the third fractions may connect respective of the flat plates to both transverse edges of the first fraction.

In this case, each of third fraction extends substantially oblique to the general plain of the automotive door. Preferably, the beam portion may have a cross section symmetric relative to a center line.

The second fraction may have a tip end portion lying substantially parallel to the first fraction.

The second fraction may be terminated within a hollow space of the beam portion and having a terminated end placed away from the first fraction for permitting deformation of the beam portion at relatively small impact force and increasing resistance against deformation at the impact force, causing seating of the terminated end of the second fraction. The second fraction may have the terminated end portion lying substantially parallel to the first fraction.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIGS. 1A to 1C illustrate the preferred embodiment of a guide beam for an automotive door structure according to the present invention, in which

FIGS. 5A to 5D show the guard beam as a finished product, in which

DESCRIPTION OF THE PREFERRED EMBODIMENT

Although references are made below to directions in describing the structure, they are made relative to the drawings (as normally viewed) for convenience. The directions, such as bottom, top, and side, are not intended to be taken literally or limit the present invention in any form.

The preferred embodiment of a guard beam for an automotive door structure according to the present invention will be discussed hereinafter with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail for clarity of illustrating the present invention.

Figure 1A:
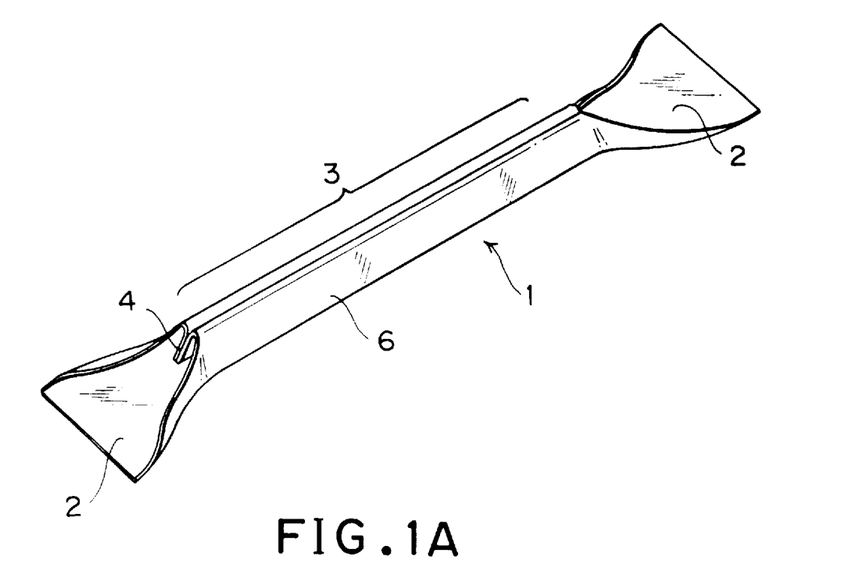
FIG. 1A is a perspective view of the entire length of the guard beam showing the basic construction.
Figure 1B:
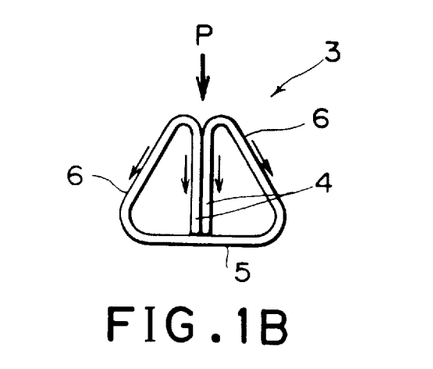
FIGS. 1B and 1C show sections at a beam portion.
Figure 1C:
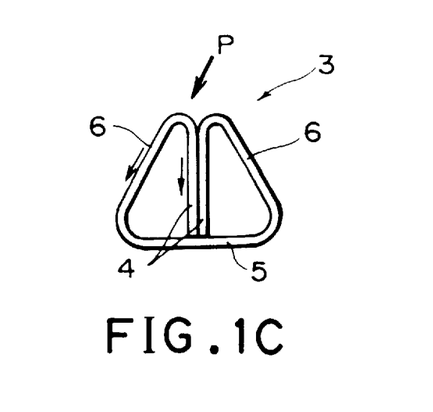

FIG. 1A is an illustration showing the basic construction of the preferred embodiment of a guard beam for an automotive door structure according to the invention, and FIGS. 1B and 1C show paths for transmitting an impact load on the preferred embodiment of the guard beam. As discussed later, the shown embodiment of the guard beam 1 is formed through only formation process (bending process) of a blank member cut from a thin steel plate by punching or the like. The guard beam 1 finished through formation process has essentially triangular palm portions 2 at opposite ends, which palm portions are gradually widened toward the axial ends. A beam portion 3 extending between both palm portions 2 has a bent cross section as illustrated in FIGS. 1B and 1C.

Namely, the beam portion 3 has generally equilateral triangular configuration in cross section having a bottom plate portion 5 continuous to the palm portions 2, and side plate portions 6 extending obliquely from both transverse edges of the bottom plate portion toward a top end peak oriented toward outside of the vehicular body. Both side edges of the blank member are bent at the top end peak toward the transverse center of the bottom plate portion to form support plate portions 4 mating each other.

Figure 4:
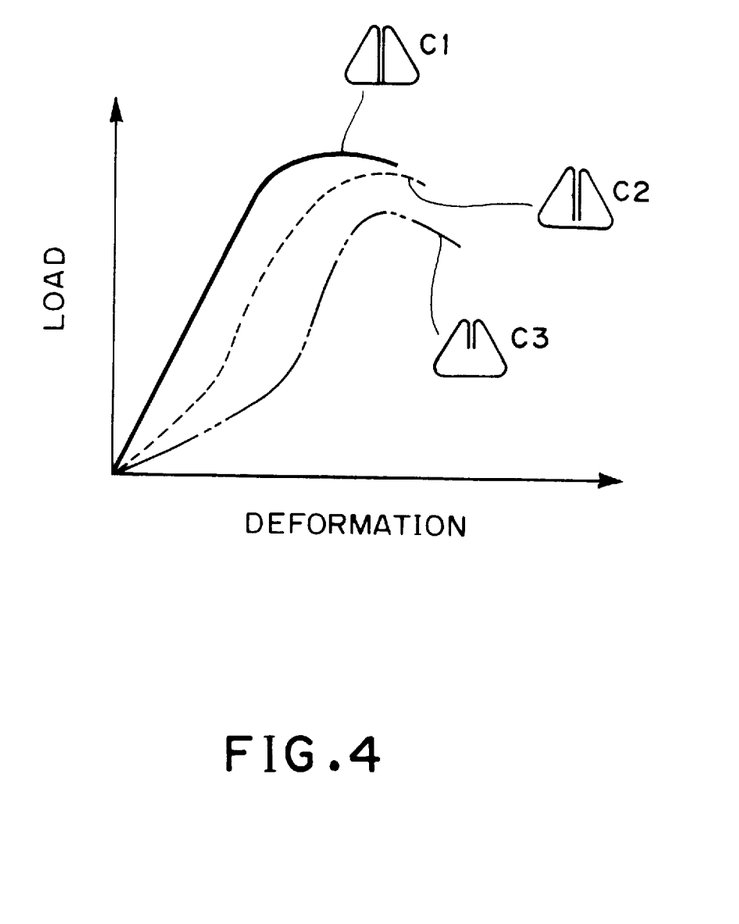
FIG. 4 is a graph illustrating respective characteristic curves representing a relationship between load and deformation of the modifications.

When an impact force P is exerted on the guard beam 1 constructed as set forth above in a direction perpendicular to the bottom plate portion 5, as shown in FIG. 1B, the impact load is distributed to both side plate portions 6 and the support plate portions 4 as illustrated by arrows. Therefore, stress will not be concentrated of. At this time, the load-deformation characteristics of the guard beam 1 becomes as illustrated by characteristic curve C1 in FIG. 4. Therefore, abrupt buckling will not occur to effectively absorb the impact load. On the other hand, when impact load P is exerted in oblique as shown in FIG. 1C, the load P is mainly born by a half (left side half in the shown case). However, even in this case, since the most load is born by the support plate portions 4 so that the whole section of the guard beam 1 can have geometrical inertia moment sufficient for effectively absorbing the impact load.

Next, discussion will be given for process of formation of the guard beam 1 illustrated in FIGS. 1A to 1C with reference to FIGS. 2A to 2F.

Figure 2A:
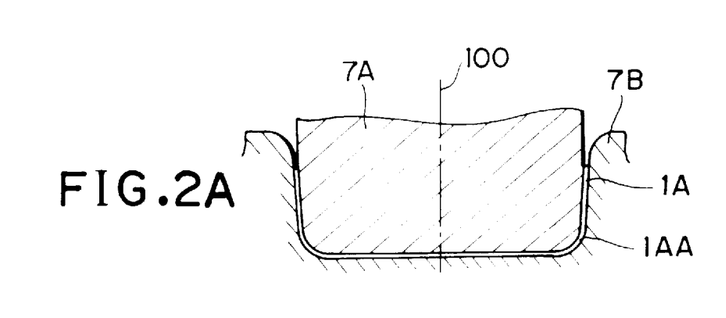
FIGS. 2A to 2F are sections of the beam portion at respective process steps in forming process of the preferred embodiment of the guard beam.
Figure 2B:
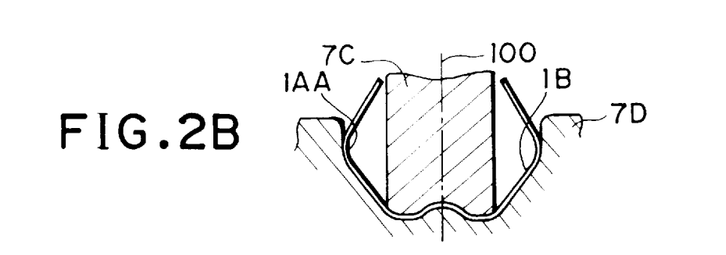
Figure 2C:
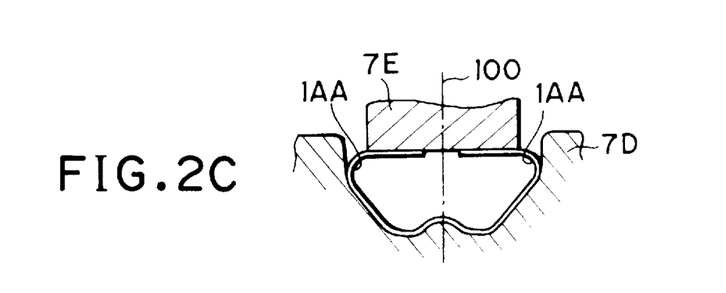
Figure 2D:
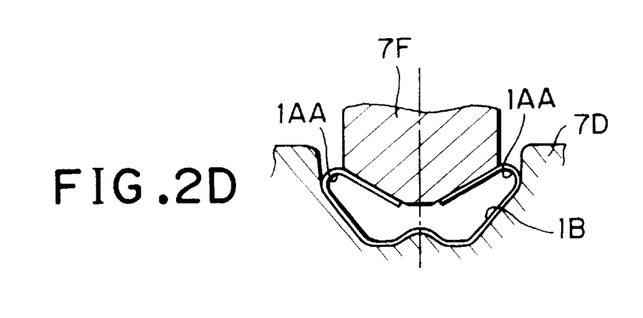
Figure 2E:
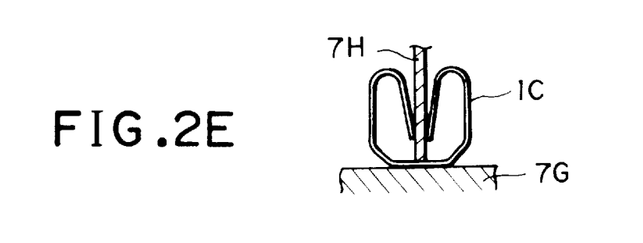

At first, as shown in FIG. 2A, the blank in a configuration where the overall guard beam 1 is developed is positioned between a first male die 7A and a second female die 7B. Then, pressing is performed for the blank to form a substantially channel shaped fist stage pressed member 1A symmetric about a center line 100. Then, the first stage pressed member 1A is subject to second stage press with a second male die 7C and a second female die 7D to be formed into a substantially W-shaped second stage pressed member 1B, as shown in FIG. 2B. Subsequently, bending processes as illustrated in FIGS. 2C, 2D and 2E are performed. In the stage illustrated in FIG. 2C, by means of a depression die 7E with a flat head, the edge portions of the second stage pressed member 1B are pressed about a bent portion 1AA to make the bending angle at the bent portion 1AA to be at an acute angle. Then, in the stage illustrated in FIG. 2D, by means of a depression die 7F, the edge portions that serve as the support plate portions 4 are further depressed toward inside. In the stage illustrated in FIG. 2E, by means of a flat plate die 7G and a depression die 7H, a bottom plate portion is pressed to be flat and the edge portions are further depressed toward inside. After the stage of FIG. 2E, a third stage pressed member 1C is formed, in which the edge portions to be the support plate portions 4 are opposed in close proximity to each other.

Figure 2F:
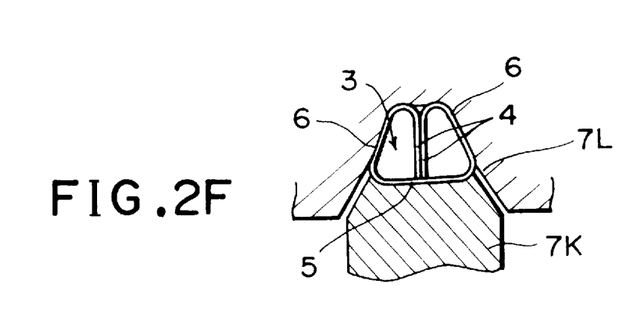

The third stage pressed member 1C thus formed through the stages of FIGS. 2C to 2E is then pressed into the configuration of the beam portion 3 as illustrated in FIG. 2F. In the stage of FIG. 2F, finishing dies 7K and 7L are employed to form the beam portion 3 of generally triangular cross section. Namely, by collapsing the third stage pressed member 1C within generally triangular die cavity between the finishing dies 7K and 7L, the final shape of the beam portion 3 can be formed with the support plate portion extending from the top end peak toward the bottom plate portion 5.

Figure 3A:
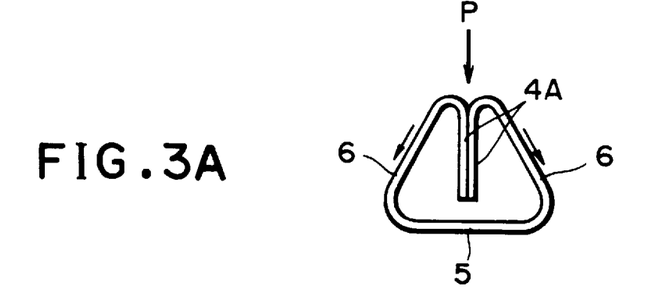
FIGS. 3A to 3D show a cross section of various modifications of the beam portion to be employed in the preferred embodiment of the guard beam according to the invention.
Figure 3B:
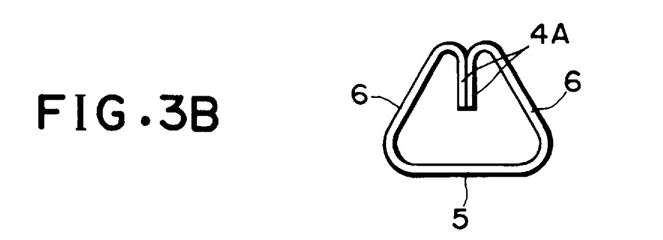

FIGS. 3A to 3D show modifications of the preferred embodiment of the guard beam according to the present invention. Among these, FIGS. 3A and 3B show embodiments, in which the support plate portions 4A formed by inwardly bending the transverse side edges at the top end peak are terminated within the space of the substantially triangular beam without reaching to the bottom plate portion 5. It should be noted that the length of the support plate portion 4A may be set arbitrarily. However, the shorter length of the support plate portion 4A inherently lowers maximum load to be borne, but shift a deformation point in the direction of increasing the deformation magnitude, as shown by curves C2 (broken line) and C3 (two dotted line) in FIG. 4. This means that the beam portion 3 may cause deformation at relatively low load but can bear the load even at relatively large deformation amount.

Figure 3C:
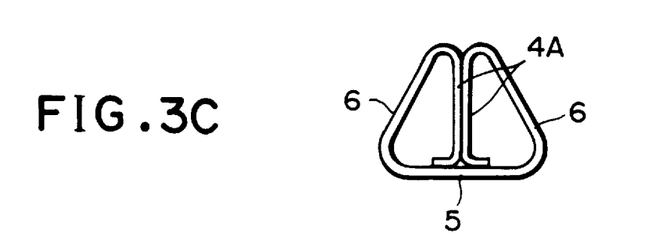
Figure 3D:
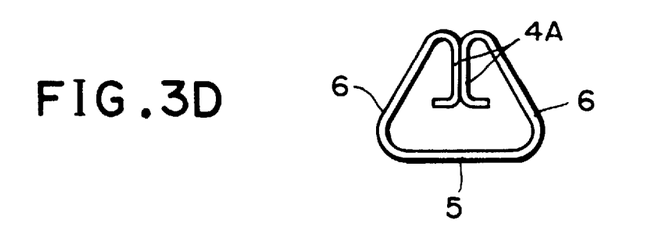

FIG. 3C shows another modification of the preferred embodiment of the beam portion of the guard beam according to the invention. In this modification, tip ends of the support plate portions 4A are bent to be substantially parallel to the bottom plate portion 5. Similarly, FIG. 3D shows a further modification of the embodiments of FIGS. 3A and 3B, in which the tip ends of the support plate portions 4A normally placed away from the bottom plate portion 5 are bent to be substantially parallel to bottom plate portion 5. In either case of FIGS. 3C and 3D, the tip end portions, which are substantially parallel to the bottom plate portions 5, may assure stable seating of the support plate portions 4A to certainly avoid buckling of the support plate portions upon exertion of high load. Therefore, with the constructions illustrated in FIGS. 3C and 3D, the tip end portions oriented in parallel to the bottom plate portions, may contribute further increasing of the maximum withstanding load.

Figures 5A, 5B, 5C, 5D:
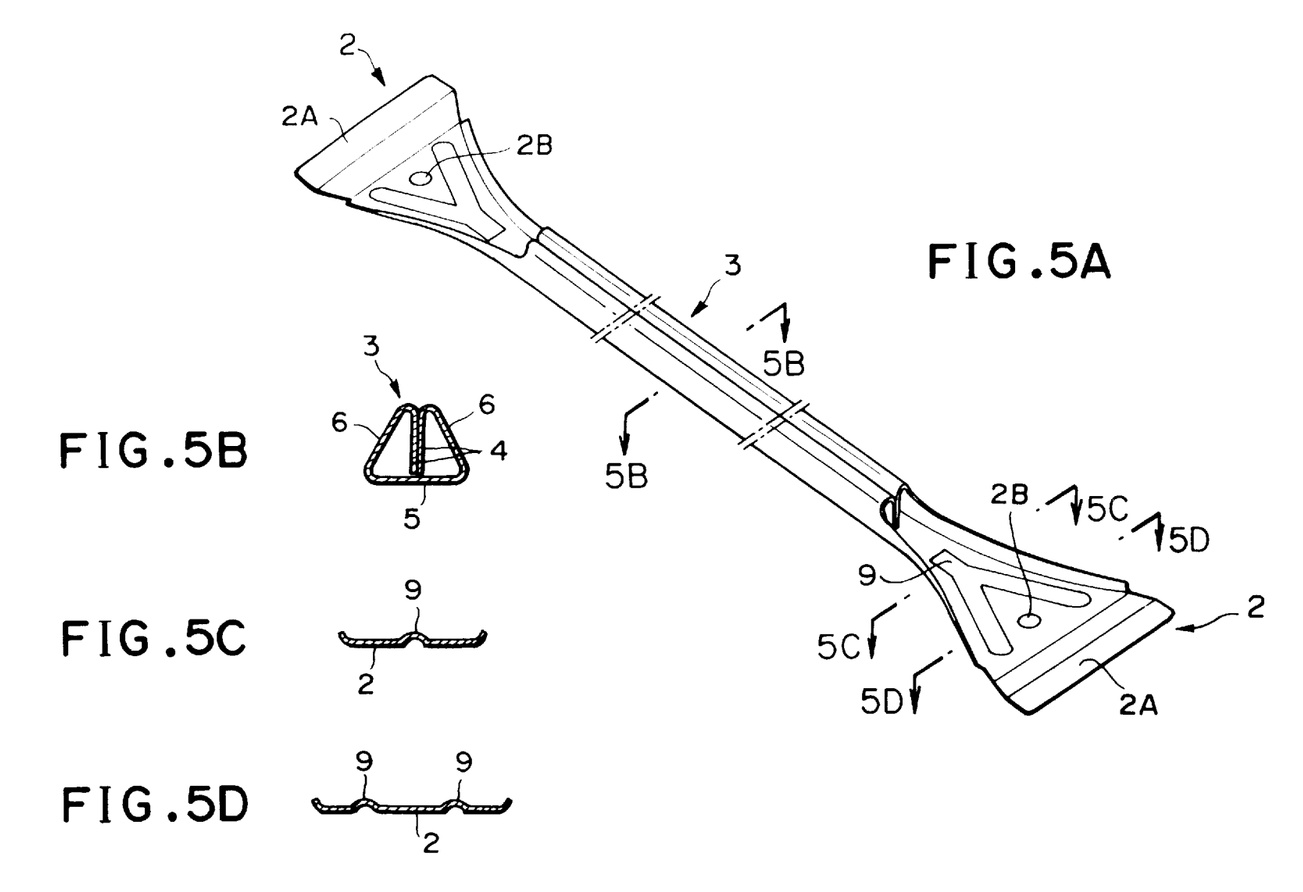
FIG. 5A is a perspective view showing the overall construction of the finished product.
FIG. 5B is a section taken along line 5B—5B of FIG. 5A.
FIG. 5C is a section taken along line 5C—5C of FIG. 5A
FIG. 5D is a section taken along line 5D—5D of FIG. 5A.

FIGS. 5A to 5D shows one example of the finished product of a guard beam for the automotive door structure according to the present invention. As shown, in FIG. 5B the beam portion 3 is formed to have the triangular cross section similar to the preferred embodiment set out with respect to FIGS. 1A to 1C. Also, the palm portions 2 at both ends of the beam portion 3 are formed with reinforcement beads 9 by press process, as shown in FIGS. 5C and 5D. It is also preferred to maintain a part of side plate portions 6 at the edges of the palm portions 2 in the form continuously extending from the side plate portions of the beam portion 3. Such extended part of the side plate portions 6 may serve as the reinforcement for the palm portions 2, and, in conjunction therewith, may serve to avoid abrupt variation of strength between the beam portion 3 and the palm portions 2.

Upon mounting the palm portions 2 at both ends on the inner panel 31 of the door, the end portions 2A of the palm portions may be welded on the inner panel 31 by way of spot welding at a plurality of points. In the alternative, utilizing bolt holes 2B provided in the palm portions 2, the palm portions may be rigidly secured on the inner panel 31 by fastening bolts. In the further alternative, both of bolt fastening and welding may be employed.

Also, the configuration of the palm portions 2 and the reinforcement beads 9 provided on the palm portions 2, and the area to form the reinforcement beads are not specified to those illustrated in FIG. 5. Also, the strength, thickness and dimension of the blank member may be appropriately set in relation to the impact load to be considered.

Also, the formation process of the beam portion 3 is not limited to the process steps illustrated in FIGS. 2A to 2F, and can employ any drawing process or press process. In short, any process that may provide uniform cross section in the longitudinal direction, such as that illustrated in FIG. 1A to 3D, can be employed.

As set forth above, since the guard beam of an automotive door structure comprises a beam portion made of a high tension steel, having a substantially triangular cross section with a bottom plate portion, a support plate portion extending from a peak of the triangular configuration remote from the bottom plate portion in a direction substantially perpendicular to the bottom plate portion and side plate portions connecting the end of the support plate portion at the peak and the transverse edges of the base plate portion, and a palm portions integrally formed with the beam portion at both longitudinal ends of the beam portions for securing the guard beam on a structural member of an automotive door, it becomes possible to provide the guard beam that is relatively light in weight but have sufficient impact load absorbing capacity with stable strength at low cost.

Also, since the shown construction of the guard beam can be formed mainly through the press process instead of requiring welding, it becomes possible to avoid possibility of causing warping, deformation or lowering of material strength due to welding heat. In addition, greater freedom can be given for selection of material, thickness and dimension of the material in view of possible impact load can be provided.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments that can be embodied within a scope encompassed and equivalents thereof with respect to the feature set out in the appended claims.

What is claimed is:

1. A guard beam of an automotive door structure comprising:

a beam portion integrally made of a high tension steel blank member, having a substantially triangular cross section with a bottom plate portion, support plate portions extending from a peak of the triangular configuration remote from said bottom plate portion in a direction substantially perpendicular to said bottom plate portion, and side plate portions each connecting each end of said support plate portions at said peak to the transverse edge of said bottom plate portions, respectively; and a palm portion integrally formed with said beam portion at both longitudinal ends of said beam portion for securing said guard beam on a structural member of an automotive door.

2. A guard beam as set forth in claim 1, wherein said support plate portion has an end remote from said peak, said end being held in contact with said bottom plate portion.

3. A guard beam as set forth in claim 1, wherein said palm portions are substantially in the form of triangle gradually widened toward opposite ends and lie in the same plane as that of said bottom plate portion.

4. A guard beam as set forth in claim 3, wherein a part of said side plate portions extends to edges of said palm portion so as to serve as reinforcement for said palm portion.

5. A guard beam as set forth in claim 4, wherein said palm portion is formed with a reinforcement bead.

6. A guard beam as set forth in claim 5, wherein said support plate portion has a tip end portion lying substantially parallel to said bottom plate portion.

7. A guard beam as set forth in claim 2, wherein said support plate portion has a tip end portion lying substantially parallel to said bottom portion.

8. A guard beam for an automotive door structure comprising:

a beam portion having a hollow cross section with a first fraction adapted to lie parallel to a general plane of an automotive door, a second fraction adapted to lie substantially perpendicular to said general plane of said automotive door and adapted to exert a first component of an impact force on said automotive door in a direction perpendicular to said general plane, and a third fraction connecting said first and second fractions and cooperating with said second fraction for distributing said impact force; and palm portions integrally formed at both ends of said beam portions and adapted to be fixed on a structural member of said automotive door for supporting said guard beam thereon, wherein said second fraction comprises two flat plates stacked in side-by-side relationship, and a pair of said third fractions connect respective of said flat plates to both transverse edges of said first fraction, and wherein each of third fractions is adapted to extend substantially obliquely to said general plane of said automotive door.

9. A guard beam as set forth in claim 8, wherein said beam portion has a cross section symmetric relative to a center line.

10. A guard beam as set forth in claim 8, wherein said second fraction is terminated within a hollow space of said beam portion and having a terminated end placed away from said first fraction for permitting deformation of said beam portion at relatively small impact force and increasing resistance against deformation at the impact force causing seating of said terminated end of said second fraction.

11. A guard beam as set forth in claim 8, wherein said second fraction has a tip end portion lying substantially parallel to said first fraction.

12. A guard beam as set forth in claim 8, wherein said second fraction has said terminated end portion lying substantially parallel to said first fraction.

\* \* \* \* \*